United States Patent
Pavlov

(10) Patent No.: US 11,224,804 B2
(45) Date of Patent: Jan. 18, 2022

(54) PERSONALIZED REMOTE GAME UPDATE CAPTURE AND RECORDING SYSTEM FOR MULTI-PLAYER ONLINE GAMES

(71) Applicant: Roblox Corporation, San Mateo, CA (US)

(72) Inventor: Pavel Pavlov, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 35 days.

(21) Appl. No.: 16/037,730

(22) Filed: Jul. 17, 2018

(65) Prior Publication Data

US 2020/0023275 A1    Jan. 23, 2020

(51) Int. Cl.
| | | |
|---|---|---|
| *A63F 13/12* | (2006.01) | |
| *A63F 13/355* | (2014.01) | |
| *A63F 13/86* | (2014.01) | |
| *A63F 13/87* | (2014.01) | |
| *A63F 13/335* | (2014.01) | |

(52) U.S. Cl.
CPC .......... *A63F 13/355* (2014.09); *A63F 13/335* (2014.09); *A63F 13/86* (2014.09); *A63F 13/87* (2014.09)

(58) Field of Classification Search
CPC .. A63F 13/497; A63F 13/525; A63F 13/5252; A63F 13/5258; A63F 13/80; A63F 13/85; A63F 13/87
See application file for complete search history.

(56) References Cited

U.S. PATENT DOCUMENTS

| | | | | |
|---|---|---|---|---|
| 8,515,253 | B2* | 8/2013 | Cottrell | G11B 27/034 |
| | | | | 386/278 |
| 9,485,290 | B1* | 11/2016 | Kolomeitsev | H04L 65/60 |
| 10,376,781 | B2* | 8/2019 | Marr | H04L 67/38 |
| 10,525,347 | B2* | 1/2020 | Gary | A63F 13/497 |
| 2007/0177606 | A1* | 8/2007 | Jabri | H04L 29/06027 |
| | | | | 370/395.5 |
| 2011/0122063 | A1* | 5/2011 | Perlman | A63F 13/335 |
| | | | | 345/161 |
| 2011/0178854 | A1* | 7/2011 | Sofer | G06Q 30/0241 |
| | | | | 705/14.4 |
| 2013/0244789 | A1* | 9/2013 | Gary | A63F 13/497 |
| | | | | 463/43 |
| 2013/0260896 | A1* | 10/2013 | Miura | A63F 13/86 |
| | | | | 463/42 |

(Continued)

*Primary Examiner* — Lawrence S Galka
(74) *Attorney, Agent, or Firm* — IP Spring

(57) ABSTRACT

A system has a network-connected game platform for a specific player, executing first software on a first processor from a non-transitory medium, a game server connected to the network, streaming game data for a specific game to the network-connected game platform, the game server executing second software on a second processor from a non-transitory medium, and an interactive interface presented on a display screen of the first mobile device, the interactive interface displaying progress of the specific game, and comprising in addition a specific command input function. Through the command input function, the player is enabled to command the system to prepare a video clip, prepared using saved game updates, displaying activity in the game, over a period of time beginning and ending at times either preprogrammed, or set by selection through specific input functions provided to the player.

18 Claims, 4 Drawing Sheets

(56) References Cited

U.S. PATENT DOCUMENTS

| | | | |
|---|---|---|---|
| 2014/0026048 A1* | 1/2014 | Spirer | G06F 3/0484 |
| | | | 715/716 |
| 2015/0099586 A1* | 4/2015 | Huang | A63F 13/87 |
| | | | 463/40 |
| 2016/0001187 A1* | 1/2016 | Sepulveda | A63F 13/77 |
| | | | 463/31 |
| 2016/0110903 A1* | 4/2016 | Perrin | H04L 67/38 |
| | | | 345/634 |
| 2017/0006322 A1* | 1/2017 | Dury | H04N 21/254 |
| 2017/0157512 A1* | 6/2017 | Long | A63F 13/86 |
| 2017/0182415 A1* | 6/2017 | Fukuda | A63F 13/35 |
| 2017/0354883 A1* | 12/2017 | Benedetto | A63F 13/533 |
| 2018/0035145 A1* | 2/2018 | Grubbs | H04N 21/2662 |
| 2019/0111343 A1* | 4/2019 | Payzer | A63F 13/25 |

* cited by examiner

PERSONALIZED REMOTE GAME UPDATE CAPTURE AND RECORDING SYSTEM FOR MULTI-PLAYER ONLINE GAMES

BACKGROUND OF THE INVENTION

1. Field of the Invention

The present invention is in the field of video online gaming and pertains more particularly to methods and apparatus for capturing portions of notable interaction in a multi-player online game from the perspective of individual ones of game session-connected players.

2. Discussion of the State of the Art

In the art of online gaming, in some circumstances many players connect to game servers with mobile platforms over a wireless network to engage in multi-player online games. Mobile platforms tend to be on devices that have battery and core processing unit (CPU) constraints. Therefore, some capabilities, such as recording a portion of game interaction from the client device, are only suitable on fixed computing platforms such as an Xbox™ or PlayStation™. These fixed devices have more CPU processing capability, typically no battery limitations, and usually high bandwidth, dedicated-cable connections to a game server over the Internet. Constantly recording a game to render as video is not practical on a mobile gaming device.

A typical mobile game player may however, be interested in obtaining a video recording such as a multi-second clip of a portion of a game where that player had some notable interaction from a game perspective. A challenge locally is that a mobile player does not have a suitable CPU for recording video while the player is engaged in a game session. Therefore, what is clearly needed is a method and system that enables a game player to direct a game server, through an in-game input mechanism, to create and record a video of a specific portion of that game.

BRIEF SUMMARY OF THE INVENTION

In an embodiment of the invention a system has a network-connected game platform for a specific player, executing first software on a first processor from a non-transitory medium, a game server connected to the network, streaming game data for a specific game to the network-connected game platform, the game server executing second software on a second processor from a non-transitory medium, and an interactive interface presented on a display screen of the first mobile device, the interactive interface displaying progress of the specific game, and comprising in addition a specific command input function. Through the command input function, the player is enabled to command the system to prepare a video clip, prepared using saved game updates, displaying activity in the game, over a period of time beginning and ending at times either preprogrammed, or set by selection through specific input functions provided to the player.

In one embodiment the network-connected game platform comprises input mechanisms enabling the specific player to control movement of an avatar or other virtual element in the specific game through updates to the game server, and the game server records the updates associated with the specific player and a time of update, and streams data back to the specific player enabling the display to update progress of the specific game. Also, in one embodiment the specific game is a multi-player game, with the game server connected to second platforms associated with second players, as well as to the first platform associated with the specific player. In one embodiment the game server creates the video presentation by retrieving updates over the preprogrammed or specified period of time and recording the updates sequentially in a video protocol. And in one embodiment the video presentation is created from updates recorded beginning at the time that the command link is triggered.

In one embodiment of the system the video presentation is created from updates recorded at a later time than the time that the command link is triggered. Also in one embodiment the video presentation is saved in a repository where the specific player is enabled to view or download and view the video presentation. In one embodiment the video presentation is communicated to and recorded by a third-party service. In one embodiment the interactive interface comprises a configuration mechanism enabling the specific player to designate other players or enterprises to have access to video presentations, and to transmit video presentations to the other players or enterprises. And in one embodiment the configuration mechanism also enables the specific player to configure start and end times and time span for video.

In another aspect of the invention a method is provided, comprising streaming game data for a specific game to a network-connected platform associated with a specific player, the platform connected to a network, by a game server connected to the network, displaying progress of the specific game on a display screen of the first mobile device, in an interactive interface comprising a specific command function, and commanding the game server to create a video clip, prepared using saved game updates, displaying activity in the game, over a period of time beginning and ending at times either preprogrammed, or set by selection through specific input functions provided to the player.

In one embodiment of the method the network-connected platform comprises input mechanisms enabling the specific player to control movement of an avatar or other virtual element in the specific game through updates to the game server, and the game server records the updates associated with the specific player and a time of update, and streams data back to the specific player enabling the display to update progress of the specific game. Also, in one embodiment the specific game is a multi-player game, with the game server connected to second platforms associated with second players, as well as to the platform associated with the specific player. In one embodiment the game server creates the video presentation by retrieving updates over the preprogrammed or specified period of time and recording the updates sequentially in a video protocol. And in one embodiment the video presentation is created beginning at the time that the command link is triggered.

In one embodiment of the method the video presentation is created at a later time than the time that the command link is triggered. In one embodiment the video presentation is saved in a repository where the specific player is enabled to view or download and view the video presentation. In one embodiment the video presentation is communicated to and recorded by a third-party service. In one embodiment the interactive interface comprises a configuration mechanism enabling the specific player to designate other players or enterprises to have access to video presentations, and to transmit video presentations to the other players or enterprises. And in one embodiment the configuration mechanism also enables the specific player to configure start and end times and time span for video.

BRIEF DESCRIPTION OF THE DRAWING FIGURES

DETAILED DESCRIPTION OF THE INVENTION

The inventor, in various embodiments described herein, provides a unique method for capturing portions of an online, multi-player video game from a perspective of a player. The present invention is described in enabling detail using following examples, which may describe more than one relevant embodiment falling within the scope of the present invention.

Figure 1:
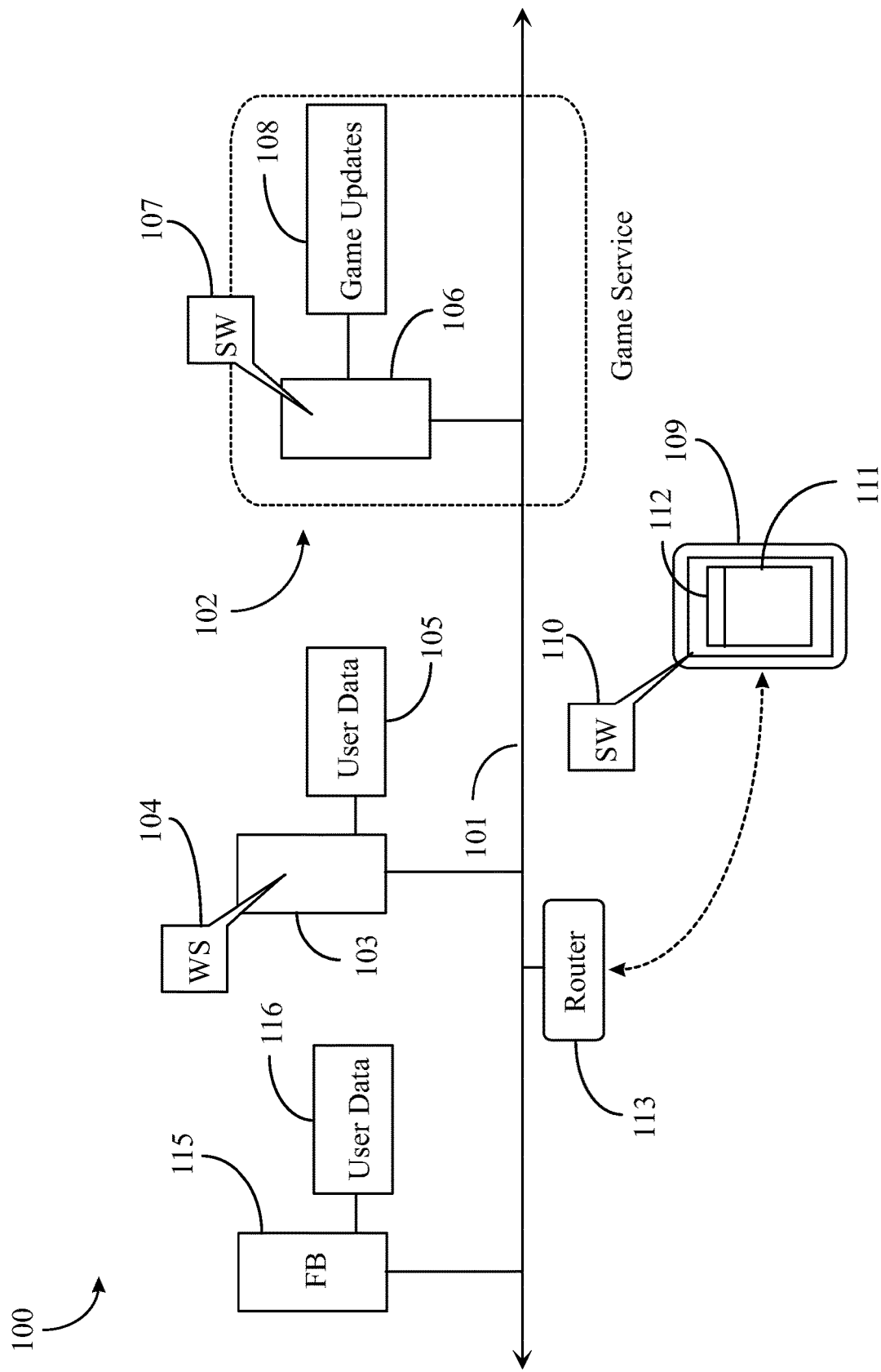
FIG. 1 is an architectural over view of an online gaming network supporting remote capture and rendering into video of game updates requested by players according to an embodiment of the present invention

FIG. 1 is an architectural over view of an online gaming network 100 supporting remote capture and rendering into video of game updates over a specific time period, according to an embodiment of the present invention. Network 100 includes an Internet network backbone 101 that represents all the lines, equipment, and access points that make up the Internet network, including any connected sub-networks to connected mobile or fixed end devices. The inventor uses the Internet as a primary support network in this embodiment because of its wide geographic reach and public access characteristics. The invention, however, may be practiced over a network including a corporate or private wide area network (WAN) or a municipal area network (MAN), or other networks with geographic limitations without departing from the spirit and scope of the present invention.

An online gaming service 102 illustrates the equipment domain of the game service. Game service 102 includes at least one game server 106 adapted to serve multi-player video games to connected players of whom a portion may be operating through mobile devices. A mobile gaming device 109 is depicted as having a wireless network connection to Internet backbone 101 through a network router 113 adapted to bridge communication, such as through an Internet service provider (ISP). It is to be understood that the invention is not limited to mobile device and may be practiced using any platform that is enabled to server a player to play a game served by game service 106. Game server 106 has connection to Internet backbone 101 and is adapted with the aid of SW 107 to receive input through player game ports, render the physics of the game session, and to stream the game updates through multiple player ports at the server.

Game server 106 includes at least one data repository 108 that may include game updates captured by the server with the aid of SW 107. Game updates may be a result of game interaction input by players in a multi-player game session, and subsequent physics and graphics rendering by the physics engine, to reflect those updates back to each of the active players. Each update broadcast to each player reflects the latest real time game update from that player's perspective in the game. More particularly, each player gets a visual perspective of the player-associated avatar in the game. Avatars may be assigned to players or selected by players to represent each associated player in game and afford those players a visual perspective of the game interaction through avatar viewpoints, often termed cameras. Game updates in repository 108 may include game updates that are saved for a time and then purged after that time has expired. In other circumstances, game updates may not be purged, and may be available for a long period of time.

A player operating mobile device 109 may connect to a web service gaming site and may select and execute game play requests through the gaming site. Mobile device 109 may be an I pad, a laptop, a smart phone, or mobile game console, or any platform that enables a player to play a game served by game server 106. Mobile device 109 may host a software application (SW) 110 adapted as a mobile device-friendly client application enabling synchronization with a website (WS) 104 running on a web server 103. Web server 103 has connection to Internet backbone 101. Website 104 may be an access point for users to interact with a gaming website promoting available games to play, and offering other features designed for website clients or members. Server 103 has connection to a data repository 105 that may be adapted in part to store member data from site members including billing information, account status information, profile information, and so forth.

Mobile device 109 in this example is assumed to be in a state of active connection online with a player playing a video game 111. Video game 111 has an input bar or section 112 adapted to accept various player-input server requests. Other controls may be available to a player operating device 109 to play game 111, such as assigned keys or buttons, virtual controller (displayed), physical controller on board or peripherally connected, and so on. Game 111 may be served directly to device 109 from game server 106 through an open game session channel brokered between the game server and the end gaming device by WS 104. In one embodiment, game 111 is played within a browser-based gaming application 110 and input bar or section 112 may include options linked to server 103 and options linked to server 106.

In general sequence of operation, a player operating device 109 may open application 110 and connect through that application, a wireless carrier network, and router 113 to WS 104 on server 103 and may log-in to synchronize data with that server. In this process, a list of video game offerings available for the client to play may be accessed through application 110. The player may initiate game play by invoking a game link from a list of game offerings. The player may then be redirected to the appropriate game server, such as server 106, to play the game. Mobile device 109 may maintain connection to WS 104 on server 103 in the background while a game session channel between mobile device 109 and game server 106 is active. The player operating mobile device 109 engages and plays game 111 (displayed on device 109) along with other online players using other devices.

In one embodiment of the invention the player operating mobile device 109 and playing game 111 may request a video clip of a period of game interaction the player wants to later have access to after the game is played. A "request to record" option may be included in input section 112, may be provided as a game-assigned player input control on the mobile device, as a control executable by virtual or physical key stroke, or any other directly-executable link. A player may execute the control when he or she decides in game to do so. The "request to record" command initiated by the player may be considered game input at server 106.

Once a request to record is received, server 106 may retrieve the incremental game updates saved, associated with the particular player, and use same to create a video that may be saved for retrieval and use by the player. In this technology, game updates are generated according to player input and physics rendering by a game engine, which moves avatars and other elements, and streams data back to players so the player's platforms may display a current status of the game. Display of a game for a particular player on that player's platform is rendered according to viewpoint (camera) of the player's avatar but may have a different viewpoint under special circumstances.

Game updates are typically sequential and are typically time stamped at the server. Game updates may thus occupy, or be included within, a specified period of history back in time from the actual time of receipt of the request to record from the particular player. The period of time may be arbitrary but may be a sufficient amount of time to cover a sequence of interactions involving the player that the player wishes recorded. Fifteen seconds of game update history might be available for capture, as one example. The time period may be pre-programmed, such that, when a request to record is received at the server, the server may retrieve all updates pertinent to the requesting player, over the last fifteen seconds in this particular example. The period may also, in some embodiments, be amenable to amendment by the player.

In this specific example, the preprogrammed period of fifteen seconds is used, at the time the command is executed, to determine the start time for the video to be recorded. That is, the system will start the video to be prepared at the time in the game fifteen seconds prior to the time the player activates the command. This enables the player to order the capture of sequences just recently experienced.

There are other circumstances, however, that may be important to a player. A player may, for example, wish to record a sequence of a game the player is about to commence. Suppose, for example, the player is about to attack another player's avatar in a competitive game and wishes to record what is now about to happen, which may include, of course, the other player's response to the attack. In this example, the command may start the video at the time of the command and the video may continue for a preprogrammed period or may continue until the player initiates the commend a second time.

There are therefore a variety of ways that start time and end time of videos to be created may be determined and an important aspect is control availability to the player of the game.

Captured game updates may be rendered into a video clip fifteen seconds long in this example, or any length from any starting point, depending on the control made available to the player. The video rendered may later be made available to the player for play or download. All server game updates are time stamped so correct order in game physics rendering may be controlled for all players having connection to and playing the same game.

Player-ordered video clips of game interactions involving the player are typically rendered according to the viewpoint of the player's avatar. However, this should not be construed as a limitation of the invention, as other camera views might be requested, such as other player's avatar cameras and fixed in-game cameras. A game video clip might be ordered in some special circumstance by one player that requests the last fifteen seconds of interaction experienced from the perspective of a different player.

Internet backbone 101 supports a server 115 operating as a social media (SM) server such as Face Book™ (FB), for example. A player operating mobile device 109 may also be a member of FB and or other social media sites or membership pages. Face Book™ server 115 has connection to a data repository 116 containing user data, like the type of data in repository 105 of server 103, more particularly, user account data such as profile information, user account information, user billing information, etc. A player operating mobile device 109 may access a recorded game video clip ordered while in-game and download it to the mobile device for later upload to a SM wall or profile page like a FB page.

In one embodiment, the player's FB account may be linked to any game in service so that once ordered and rendered, a video clip may be forwarded from the game server or server 106 to FB server 115 and may be added to a user data profile as, perhaps, a saved video for later execution and display on the user's FB page. A download of the video clip may not be necessary as the game service may also post on behalf of a player with explicit permission of the player to do so. Game service 102 might forward copies of video clips ordered to specific persons sanctioned by the player to receive them, such as other players known socially, for example, at WS 104, friends, for example. In one embodiment, a preview option may be provided at the game server that may provide access to the requested game video clip for preview by the ordering player before the player downloads or authorizes sharing of the clip with other sites, web pages, or online accessible friends.

Figure 2:
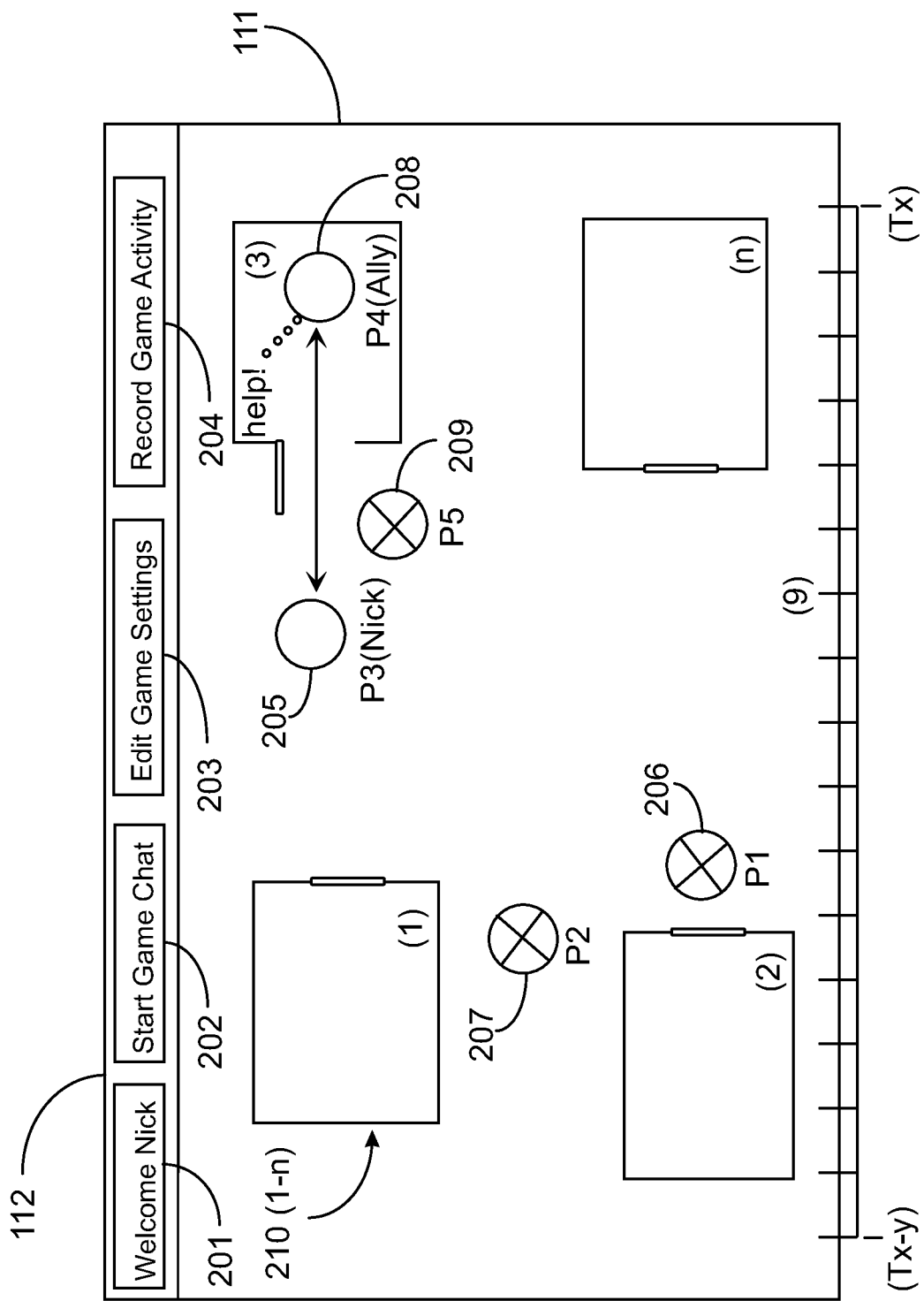
FIG. 2 is an exemplary screen shot of a simple game sequence that may be captured remotely in response to a player request to record.

FIG. 2 is an exemplary interactive user interface 200 showing a game sequence that may be captured remotely in response to a player request to record. Interface 200 depicts game 111 and user input bar 112. Input bar 112 may be personalized to a player and may have a welcome icon 201 welcoming the player by name. There may be various other options present on input bar 112 including an option 202 to initiate in-game chat with another player or players, and an option 203 to edit game settings 203. There is also a record option 204 provided in input bar 112 to enable a user to order capture and production of a video clip covering interaction by the player over a period of history, or over a period of time going forward. This link is unique to the present invention.

In this exemplary circumstance, there are five players, four of which are involved in interaction in the game with a player 205 that is labeled P3 (Nick) over a measured period of time as depicted by a reference scale at the bottom of this view. In this case, player 205 P3 (Nick) has a game ally or team mate player 208 also depicted as P4 (Ally). Ally P4, teammate of Nick P3, was captured in this scenario by an opposing player and held captive in one of a number of detention containers 210 (1-n). In this case, ally 208 is rendered prisoner inside container 210 (3) pleading for help or rescue by a teammate. Interaction by Nick P3 to rescue P4 may take place in a sequence of game updates that are sequential and spread over a time period in the game.

At the bottom of interface 200 a time scale is referenced to depict a time span of equal time units within the range of which player P3 performed game interactions designed to free his ally P4. P4 is formerly in one of several identical containers 210 (1-n). In this interaction, player 205 P3 Nick has confronted player 206 (P1) depicted as a guard of container 210 (2) and has dispatched that player during interaction with that player. Similarly, player 207 (P2)

guarding container 210 (1) is also confronted and dispatched by player P3 (Nick). Player 207 (P2) has also been confronted and dispatched by player 205. Player 209 (P5) happens to be the correct guard of detained or neutralized player 208 P4 (Ally) kept inside container 210 (3). Player 209 is also confronted and dispatched by player 205 P3 Nick. Player 205 P3 Nick opens container 210 (3) and rescues player 208 P4 (Ally).

Shortly or just after success in the rescue of Allied player (208), player 205 may invoke option 204 to Record Game Activity. T(x) is depicted at the current or present end of the time scale where T represents the current total of time in units elapsed since the game started and wherein (x) represents the unit of measure of time used on the scale, typically seconds. T(x) represents a point in time a player determines to initiate a capture of game interaction. In this example T(x) represents the point in game time where player Nick invokes option 204 to capture the experience of rescuing his ally from the other players involved in detainment and concealment of the allied player. In this case, the game update history spans back 15, seconds, or other preprogrammed time period, from T(x) or T(x)-Y where Y equals the pre-programmed period. Game updates may be time stamped at the game server analogous to server 106 FIG. 1. Invocation of the request to record by a player is also a game update that initiates a separate server action that is not relative to the physics engine, but to the cache of game updates stored on behalf of the player 205.

In this case, a clip of a duration equal to the time period covers all the game interaction updates desired by the player. When the updates are rendered as video, the video clip will cover the rescue operation of player 208 by player 205 (Nick). Record option 204 may be invoked as a game input command by a player that instructs the game server to retrieve the game updates spanning back from T(x) (server recognition of request-latency) to T(x)-y. The exact time allowed for a video clip length may vary, for example as short as a ten second clip or a clip 30 seconds long, or longer. However, if the server has a policy of purging game updates after a period of time shorter than the game itself the player's request may not include any purged updates and is therefore limited to updates still available to the server.

In another circumstance, described briefly above, the player may wish to activate a recording command to begin just before the player begins the attack to free player 208. In this embodiment the record game activity may be a multiple option command wherein the player may elect a video over a previously elapsed time, or may elect to start a video at time "now", and may also be given a selection of time periods to choose.

In one implementation, there may be more than one available range where the game server will save game update history, so a player may have a configuration option to set a selected time window or to create a custom time window. It is noted herein that each player in the game will have a different game update history from the perspective of the player's local perception through avatar cameras associated to those players. It is also noted that each player's update history is preferably taken from the visual perspective of that player's avatar camera although that is not a specific limitation of the invention, as other perspectives may also be observed in some special cases.

Figure 3:
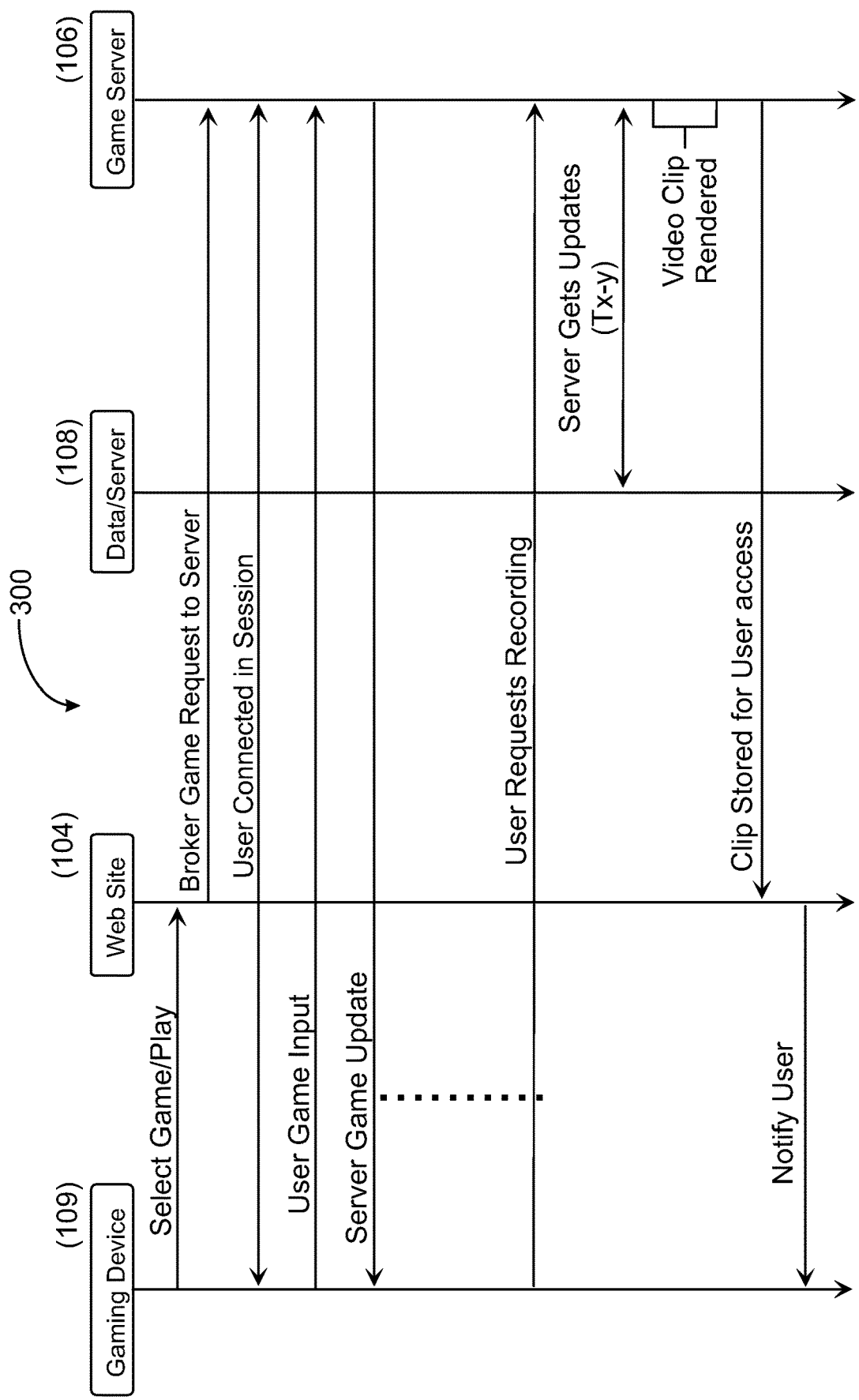
FIG. 3 is a sequence diagram depicting interaction between a player's gaming device and interactive online terminals according to an embodiment of the present invention.

FIG. 3 is a sequence diagram 300 depicting interaction between a player's gaming device and interactive online terminals according to an embodiment of the present invention. Diagram 300 depicts a gaming device analogous to device 109 of FIG. 1 and therefore is labeled with the same element number in parentheses (109). Similarly, website (104) is depicted along with a data server analogous to server (108), and a game server analogous to server (106) of FIG. 1.

It may be assumed that gaming device (109) is running a game application (SW 110) and is connected to website (104). A player operating device (109) may select an online game to play through the local application while connected to website (104). Website (104) may then broker that player's game request to a game server like game server (106) in a redirect-to-server operation that results in a game session channel established between the player operating device (109) and the game server (106).

The player operating gaming device (109) begins gaming by entering game input, such as avatar selection and any other preliminary input required, before starting actual play. It is noted herein that the player controls an avatar and is represented in the game by that avatar. Game server (106) updates the game to reflect the new player's state to the player and all the other players in the multi-player game. The periods on the vertical axis represent time in interaction between the player operating device (109) and game server (106) as input is sent to the server by that player and the server updates the game feed for that player and all the other players. Every game update is dated with a time stamp at the game server and there may be a time to live (TTL) for all kept updates in data server (108). For each update, as TTL expires, that update may be purged from the database. It is noted that an exact time for a TTL is arbitrary and may impose a limit on how heavy a subsequently rendered video clip containing serial game updates from the player's perspective may be. In one embodiment, the time might be customized somewhat by allowing players to select from a few time options.

In this example, the player operating device (109) connected in session with server (106) may determine to request a video recording at any point in time (Tx) in an active game session. The request is recognized as in-game input from that player received through a virtual player port. The request is time stamped and treated as a command for the server to retrieve the game updates from database (108) that span back (Tx-y). In one use case, y=TTL for all game updates for that player. In another use case, y<=to but not>TTL established for all game updates.

Game server (106) may render a video clip on behalf of the player operating device (109) and according to the received input command and established parameters. This sequenced action is not specifically required during game time to successfully practice the present invention. Server (106) may queue the game updates for a period of time and then render video on behalf of the player at a later time, later after the player is no longer in the game. Moreover, a player may make more than one recording request relative to game interaction that the player may find worth capturing. It is up to each player to input the request to record command within a time frame that will allow capture of the interaction the player wishes to record. If a player waits too long some of that interaction may have fallen past TTL for game updates.

Server (106) may forward rendered video clips recorded on behalf of a player to the website (104) that brokered the connection to the server for that player. In this regard the video clips sent to website (104) for storage may identify the game played, the player handle or other identification of player that is recognized by the website, and perhaps a game summary or title relative to the captured content. Video clips might include audio and perhaps a short game advertisement or other sponsored advertisement that may also include an executable link to the game or product advertised.

Website (109) may provide notification to the ordering player of availability of one or more video clips received from a game service. In one embodiment notification of the available videos is given at the next log-in by the player and synchronization of data between the website and the player's client application. It is noted herein that a client application is not a limitation of the invention but a unique convenience to the clients of the site. In actual practice a player does not require a client application to practice the invention so long as the client's gaming device and platform has the capability of connecting in session with the website and game server.

It is noted that FIG. 3 is specific to ordering a video clip over a previously-elapsed time period. The timing diagram will be different for the circumstance that a player orders a video for a time to begin when the player initiates the command.

In yet another embodiment of the invention there may be configuration facility for a player to initiate a record command, not be selecting an input, but by setting a triggering circumstance. In this embodiment a player may configure to order a video from a time that the player selects a particular weapon, or at a time that the player makes a specific move of the player's avatar, or a combination of moves by the players avatar. That video may be terminated by a different move or combination of moves.

Figure 4:
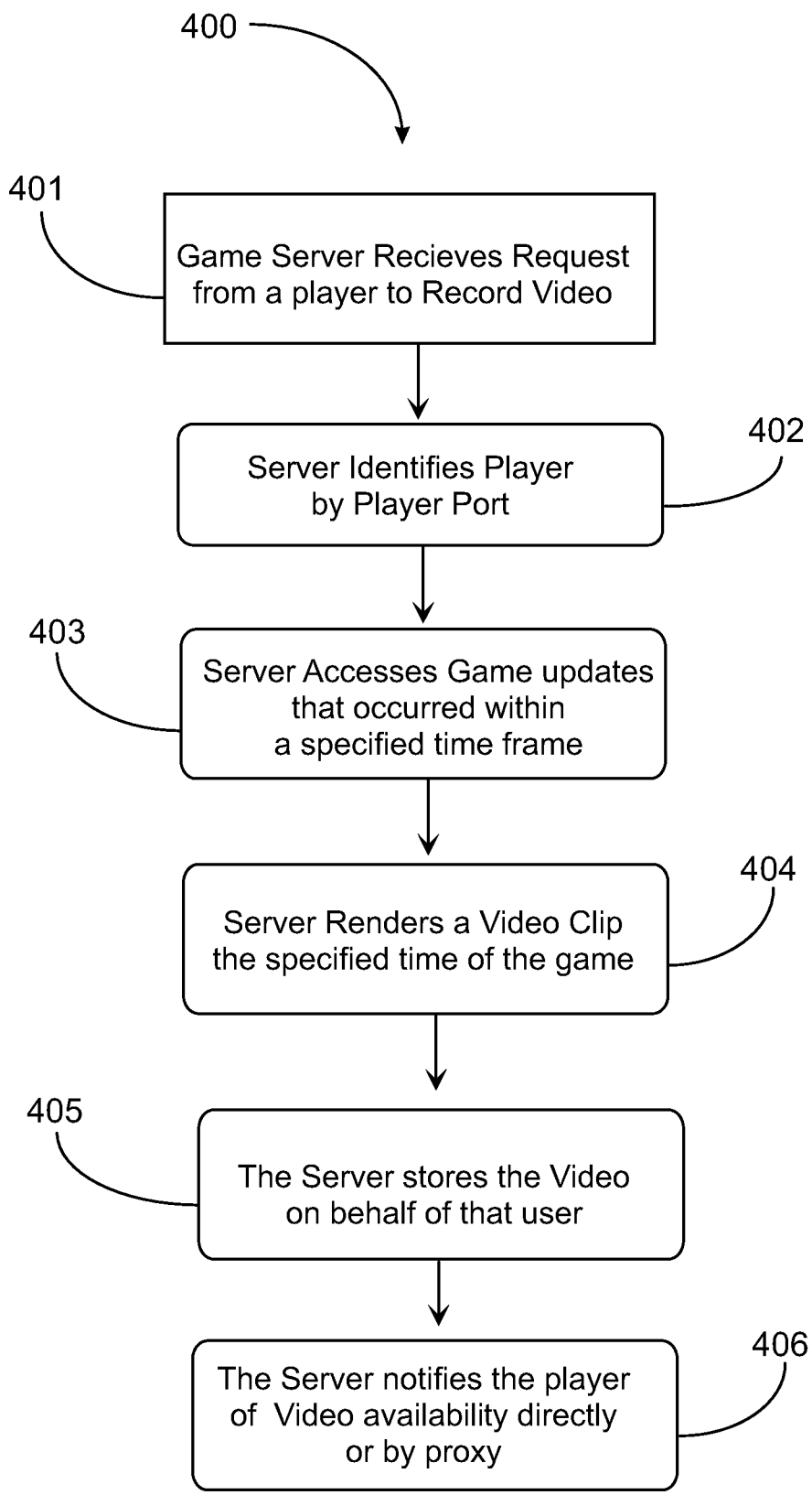
FIG. 4 is a process flow chart depicting steps for remote capture and render of video resulting from a player request to a game server during play of a video game.

FIG. 4 is a process flow chart 400 depicting steps for remote capture and render of video resulting from a player request to a game server during play of a video game. At step 401, a game server analogous to game server 106 of FIG. 1 receives a request in the form of player in-game input to record a video clip. The input may afford configuration options to the player, or configuration may be set. The player request may originate from within session while playing a multi-player online game at the server. A record action button might be provided as a visible option in-game or on an input bar as described further above. Other controls may also be used such as an assigned key stroke, a macro, or a button or joystick position on a game controller on the gaming device or associated to the gaming display as a connected peripheral device.

At step 402, the game server identifies the player by gaming port address and player handle. The server may treat the request as game input command to access game updates stored for the purpose at step 403 from a data repository accessible to the server. The updates are associated with the requesting player in the connected database and may be centered around the player's avatar perspective of the game interaction. The server gets all the sequential time stamped game updates that occurred over a time span beginning and ending, determined by preprogrammed data, or input at the time of making the command.

The server may then or at some later time render a video clip in a video protocol, such as MP4, from the game update history that covers the time of interactions of the requesting player from that player's avatar perspective. The server may store the video clip on behalf of the requesting player at step 405 and may notify the player of the availability of the video at step 406. Notification may be made through any communications channel available to the server and player. In one embodiment, the server may undertake game update retrieval and video rendering while the requesting player is still playing the game and the recorded video clip or clips may be saved for the player and may be available to download at the end of the game or before the player breaks connection with the server. In such an embodiment, notification to the player of availability of the videos may be made in-game to the player as an in-game notification or update.

In another implementation, a proxy is involved such as a website the player belongs to as a member. In such an embodiment, the website analogous to website 104 of FIG. 1 may automatically receive any recorded clips rendered by the game server for the requesting player forwarded thereto for storage by the server. Therefore step 405 may be performed through proxy, for example the player's gaming website. In a variation of this embodiment, the server may have a list of websites to which the player belongs whereby the server forwards a copy of the video clip to all listed sites for those sites to store the video clip for the requesting user. In the case of forwarding the video clips after rendered to the website that brokered the player/game server connection, the website may store the data for that player and notification may appear in the player's client application at the next log-in and data synchronization with the web server.

It will be apparent to one with skill in the art that the multi-player gaming system of the invention may be provided using some or all the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system, comprising:
   a game platform associated with a specific player, the game platform comprising a first processor executing first software from a first non-transitory medium coupled to the first processor, and a display device; and
   a game server in operative communication with the game platform over a network, the game server configured to stream game data for a specific game to the game platform, the game server comprising a second processor executing a game engine from a second non-transitory medium coupled to the second processor;
   wherein the display device is configured to receive instructions from the first processor to display an interactive interface, the interactive interface configured to display live progress of the specific game as it is being played by the specific player, and comprising a specific command input function to the specific player; and
   wherein, the game server is configured to perform operations comprising:
     store game updates of the specific game at the game server, the game updates being automatically generated based on interaction of the specific player within the specific game, the game updates representing input from the specific player for interaction with game elements during gameplay of the specific game;
     receive a first video trigger from the game platform during gameplay of the specific game, the first video trigger indicative of the specific command input function received at a first specific time;
     initiate rendering of a video clip responsive to the first video trigger, the video clip being based on a physics rendering of the game environment by the game engine using the stored game updates commencing at the first specific time;

receive a second video trigger from the game platform during the gameplay of the specific game, the second video trigger occurring after the first video trigger, and the second video trigger indicative of the specific command input function received at a second specific time;

responsive to the second video trigger, finish rendering of the video clip at the second specific time to create a rendered video clip, the rendered video clip including a game environment of the specific game according to a viewpoint of an avatar that represents the specific player in the game environment and being based on the physics rendering of the game environment by the game engine using the stored game updates commencing at the first specific time and ending at the second specific time;

provide a preview of the rendered video clip to the game platform associated with the specific player; and responsive to the specific player at least partially reviewing the preview, automatically forward the rendered video clip to one or more other persons sanctioned by the specific player to receive the rendered video clip, wherein the rendered video clip further comprises an advertisement and an executable link, the executable link directing the game server to stream game data of the specific game to another gaming platform associated with another player different from the specific player.

2. The system of claim 1, wherein the game updates further comprise a timestamp that is indicative of the first specific time or the second specific time.

3. The system of claim 1, wherein the specific game is a multi-player game and wherein the system further comprises a plurality of game platforms associated with a plurality of players.

4. The system of claim 1, wherein rendering the video clip comprises retrieving the game updates associated with timestamps that are each after the first video trigger and recording the game updates sequentially based on the timestamps in a video protocol.

5. The system of claim 1, wherein the rendered video clip is stored in a repository accessible by the specific player.

6. The system of claim 1, wherein the rendered video clip is transmitted to a second server that is remote from the game platform.

7. The system of claim 1, wherein the interactive interface further comprises a configuration mechanism to designate access to the rendered video clip.

8. The system of claim 7, wherein the configuration mechanism is further configured for selection of one or more of: start time, end time, or time span of a requested video clip.

9. A method, comprising:

streaming game data for a specific game from a network-connected game server to a game platform connected to the network and associated with a specific player, wherein the game platform comprises a display device, wherein the display device is configured to display an interactive interface, and wherein the interactive interface comprises a specific command input function to the specific player;

displaying live progress of the specific game on the display device of the game platform, within the interactive interface;

saving game updates of the specific game at the game server, the game updates being automatically generated based on interaction of the specific player within the specific game, and the game updates representing input from the specific player for interaction with game elements during gameplay of the specific game;

receiving a first video trigger from the game platform during gameplay of the specific game, the first video trigger indicative of the specific command input function received at a first specific time;

initiating rendering of a video clip responsive to the first video trigger, the video clip being based on a physics rendering of the game environment by the game server using the stored game updates commencing at the first specific time;

receiving a second video trigger from the game platform during the gameplay of the specific game, the second video trigger occurring after the first video trigger, and the second video trigger indicative of the specific command input function received at a second specific time;

responsive to the second video trigger, finishing rendering of the video clip at the second specific time to create a rendered video clip, the rendered video clip including a game environment of the specific game according to a viewpoint of an avatar that represents the specific player in the game environment and being based on the physics rendering of the game environment by the game engine using the stored game updates commencing at the first specific time and ending at the second specific time;

providing a preview of the rendered video clip to the game platform associated with the specific player; and responsive to the specific player at least partially reviewing the preview, automatically forwarding the rendered video clip to one or more other persons sanctioned by the specific player to receive the rendered video clip, wherein the rendered video clip further comprises an advertisement and an executable link, the executable link directing the game server to stream game data of the specific game to another gaming platform associated with another player different from the specific player.

10. The method of claim 9 wherein the game updates further comprise a timestamp that is indicative of the first specific time or the second specific time.

11. The method of claim 9, wherein the specific game is a multi-player game.

12. The method of claim 9, wherein rendering the video clip comprises retrieving game updates associated with timestamps that are each after the video trigger and recording the game updates sequentially based on the timestamps in a video protocol.

13. The method of claim 9, wherein the rendered video clip is stored in a repository accessible by the specific player.

14. The method of claim 9, wherein the rendered video clip is transmitted to a second server that is remote from the game platform.

15. The method of claim 9, wherein the interactive interface further comprises a configuration mechanism to designate access to the rendered video clip.

16. The system of claim 15, wherein the configuration mechanism is further configured for selection of one or more of: start time, end time, or time span of a requested video clip.

17. A non-transitory computer-readable medium with instructions stored thereon that, responsive to execution by a processing device, causes the processing device to perform operations comprising:

streaming game data for a game from a game server to a game platform associated with a player, wherein the game platform is configured to display an interface comprising a record command input function to the specific player;

displaying live progress of the specific game on the game platform and the record command input function;

saving game updates of the game at the game server, the game updates being automatically generated based on interaction of the player within the game, and the game updates representing input from the player for interaction with game elements during gameplay;

receiving a first video trigger from the game platform during gameplay, the first video trigger indicative of the record command input function received at a first specific time; and initiating rendering of a video clip responsive to the first video trigger, the video clip being based on a physics rendering of the game environment by the game server using the stored game updates commencing at the first specific time;

receiving a second video trigger from the game platform during the gameplay of the specific game, the second video trigger occurring after the first video trigger, and the second video trigger indicative of the record command input function received at a second specific time;

responsive to the second video trigger, finishing rendering of the video clip at the second specific time to create a rendered video clip, the rendered video clip including a game environment of the specific game according to a viewpoint of an avatar that represents the specific player in the game environment and being based on the physics rendering of the game environment by the game engine using the stored game updates commencing at the first specific time and ending at the second specific time;

providing a preview of the rendered video clip to the game platform associated with the specific player; and responsive to the specific player at least partially reviewing the preview, automatically forwarding the rendered video clip to one or more other persons sanctioned by the specific player to receive the rendered video clip, wherein the rendered video clip further comprises an advertisement and an executable link, the executable link directing the game server to stream game data of the specific game to another gaming platform associated with another player different from the specific player.

18. The non-transitory computer-readable medium of claim 17, wherein the game updates further comprise a respective timestamp that is indicative of the first specific time or the second specific time.

* * * * *